United States Patent
Park et al.

(10) Patent No.: US 8,750,878 B2
(45) Date of Patent: Jun. 10, 2014

(54) METHOD AND SYSTEM OF DETERMINING WHETHER A MOBILE STATION IS LOCATED INSIDE A COVERAGE AREA OF A NARROWBAND REPEATER AND USING THE DETERMINATION IN A HANDOVER PROCEDURE

(75) Inventors: Sungki Park, Ashburn, VA (US); Saied Kazeminejad, Ashburn, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 525 days.

(21) Appl. No.: 12/759,195

(22) Filed: Apr. 13, 2010

(65) Prior Publication Data
US 2011/0250886 A1  Oct. 13, 2011

(51) Int. Cl.
*H04W 36/00* (2009.01)
(52) U.S. Cl.
USPC ............ 455/437; 455/436; 455/443; 455/444
(58) Field of Classification Search
CPC .................................................... H04W 36/30
See application file for complete search history.

(56) References Cited

U.S. PATENT DOCUMENTS

| | | | | |
|---|---|---|---|---|
| 4,670,899 | A | * | 6/1987 | Brody et al. ................... 455/453 |
| 7,734,249 | B1 | | 6/2010 | Mitchell, Jr. et al. |
| 2002/0115448 | A1 | | 8/2002 | Amerga et al. |
| 2007/0071128 | A1 | | 3/2007 | Meir et al. |
| 2007/0293235 | A1 | | 12/2007 | Inayoshi et al. |
| 2008/0146231 | A1 | * | 6/2008 | Huang et al. ................... 455/436 |
| 2011/0047029 | A1 | * | 2/2011 | Nair et al. ................... 705/14.52 |

* cited by examiner

*Primary Examiner* — Huy C Ho

(57) ABSTRACT

A method and system of determining whether a mobile station is located inside (or moving into) a repeater's coverage area and using the determination in a handover procedure. An access network may receive from a mobile station communicating on a first wireless link an indication of channel quality for the first wireless link and a second wireless link that serve the same coverage area. The access network may then use the channel quality indicators to determine whether the mobile station is located inside (or moving into) a repeater's coverage area, such as by comparing the channel quality indicators. If the access network determines that the mobile station is located inside (or moving into) the repeater's coverage area, it may also initiate a handover of the communication with the mobile station to the repeated wireless link (e.g., which may include suspending application of a load threshold to the repeated wireless link).

16 Claims, 5 Drawing Sheets

METHOD AND SYSTEM OF DETERMINING WHETHER A MOBILE STATION IS LOCATED INSIDE A COVERAGE AREA OF A NARROWBAND REPEATER AND USING THE DETERMINATION IN A HANDOVER PROCEDURE

BACKGROUND

In a typical cellular wireless network, an area is divided geographically into a number of coverage areas, such as cells and sectors, each defined by a radio frequency (RF) radiation pattern from a respective base station). Within each coverage area, the base station's RF radiation pattern provides one or more wireless links, each on a corresponding carrier, over which mobile stations may communicate with the cellular wireless network. In turn, the cellular wireless network may provide connectivity with one or more other networks, such as the public switched telephone network (PSTN) or the Internet.

The cellular wireless network described above may additionally include one or more repeaters, each of which functions to repeat signals between a base station and a mobile station. Typically, a repeater is employed to extend the range of a coverage area and/or fill a hole in a coverage area. In operation, a repeater may receive signals from a base station, amplify the signals, and then transmit the amplified signals into the repeater's coverage area for receipt by a mobile station. Correspondingly, the repeater may receive signals from a mobile station located inside the repeater's coverage area, amplify the signals, and then transmit the amplified signals to the base station. The repeater may perform other functions as well.

One common type of repeater is a narrowband repeater, which can only repeat signals on one carrier—and thus one wireless link—between a base station and a mobile station. In this respect, when a narrowband router is employed in a coverage area having multiple wireless links, problems may arise. One problem with employing a narrowband repeater in a coverage area having multiple wireless links is that a base station may not be able to readily determine whether a given mobile station is located inside a coverage area of a repeater amplifying one of the wireless links. In turn, the base station may not be able to account for the given mobile station's presence inside (or outside) the narrowband repeater's coverage area during a handover procedure (e.g., an active session load balancing handover procedure), which may result in a dropped call. Accordingly, an improved method for determining whether a mobile station is located inside a narrowband repeater's coverage area and using the determination in a handover procedure is desired.

OVERVIEW

Disclosed herein are methods of determining whether a mobile station is located inside a coverage area of a repeater and using the determination in a handover procedure.

A method of determining whether a mobile station is located inside a coverage area of a repeater may include an access network (a) communicating with a mobile station over a first wireless link, (b) receiving from the mobile station an indication of channel quality (e.g., carrier-to-interference noise ratio and/or received signal strength indication) for each of the first wireless link and a second wireless link detected by the mobile station, (c) determining that the first wireless link and the second wireless link serve a same coverage area of the access network, and (d) after determining that the first wireless link and the second wireless link serve the same coverage area of the access network, using the received indications of channel quality for the first wireless link and the second wireless link to determine whether the mobile station is located inside a coverage area of a repeater.

If the access network determines that the mobile station is located inside a coverage area of a repeater, the method may also include additional features. For example, the method may additionally include a feature of confirming that one of the first wireless link and the second wireless link is being repeated by a repeater. As another example, the method may additionally include a feature of determining which of the first wireless link and the second wireless link is being repeated by the repeater, such as by determining which of the first wireless link and the second wireless link has a greater indication of channel quality and/or determining which of the first wireless link and the second wireless link is being repeated by the repeater based on data indicating which wireless links of the access network are being repeated by a repeater.

The feature of using the received indications of channel quality for the first wireless link and the second wireless link to determine whether the mobile station is located inside a coverage area of a repeater may take various forms. In one example, this feature may include (1) calculating a difference between the received indications of channel quality for the first wireless link and the second wireless link, (2) comparing the calculated difference to a first threshold, (3) if the calculated difference is greater than the first threshold, determining that the mobile station is located inside a coverage area of a repeater; otherwise, and (4) if the calculated difference is less than or equal to the first threshold, determining that the mobile station is located outside a coverage area of a repeater. Additionally, this feature may include determining that one of the received channel indications is greater than a second threshold before calculating a difference between the received indications of channel quality for the first wireless link and the second wireless link.

A method of handing over a communication with a mobile station moving into a coverage area of a repeater may include an access network (a) engaging in a communication with a first mobile station over a first wireless link, (b) receiving from the first mobile station a request to initiate a handover of the communication from the first wireless link to a new wireless link, wherein the request includes an indication of channel quality for each of the first wireless link and a second wireless link detected by the first mobile station, (c) in response to receiving the request, determining that the first mobile station is moving into a coverage area of a repeater that repeats the second wireless link, and (d) in response to determining that the first mobile station is moving into a coverage area of a repeater that repeats the second wireless link, initiating a handover of the communication with the first mobile station from the first wireless link to the second wireless link. In this respect, the feature of determining that the mobile station is moving into a coverage area of a repeater that repeats the second wireless link may include features similar to those described above for determining whether a mobile station is located inside a coverage area of a repeater.

The feature of initiating the handover of the communication with the first mobile station from the first wireless link to the second wireless link may also take forms. In one example, this feature may include suspending application of a load threshold that would have otherwise been applied to the second wireless link. In this respect, the feature of suspending application of a load threshold that would have otherwise been applied to the second wireless link may include disregarding a predefined load threshold for the second wireless link.

The method of handing over the communication may also include additional features. For example, the method may additionally include the access network (e) after initiating the handover of the communication with the first mobile station from the first wireless link to the second wireless link, determining that the second wireless link is highly loaded, (f) in response to determining that the second wireless link is highly loaded, deciding to initiate a handover of a communication from the second wireless link to another wireless link, (g) identifying for the handover a second mobile station that is (1) engaging in a communication with the access network over the second wireless link and (2) located outside the coverage area of the repeater, and (h) handing over the communication with the second mobile station from the second wireless link to another wireless link. In this respect, the feature of identifying for the handover a second mobile station that is located outside the coverage area of the repeater may include features similar to those described above for determining whether a mobile station is located inside a coverage area of a repeater.

Also disclosed herein is a base station that includes (a) an antenna structure for communicating with one or more mobile stations over respective wireless links, (b) a communication interface for communicating with a network entity, (c) a processor, (d) data storage, and (e) program instructions stored in the data storage and executable by the processor for carrying out functions described herein.

These as well as other aspects and advantages will become apparent to those of ordinary skill in the art by reading the following detailed description, with reference where appropriate to the accompanying drawings.

DETAILED DESCRIPTION

Figure 1:
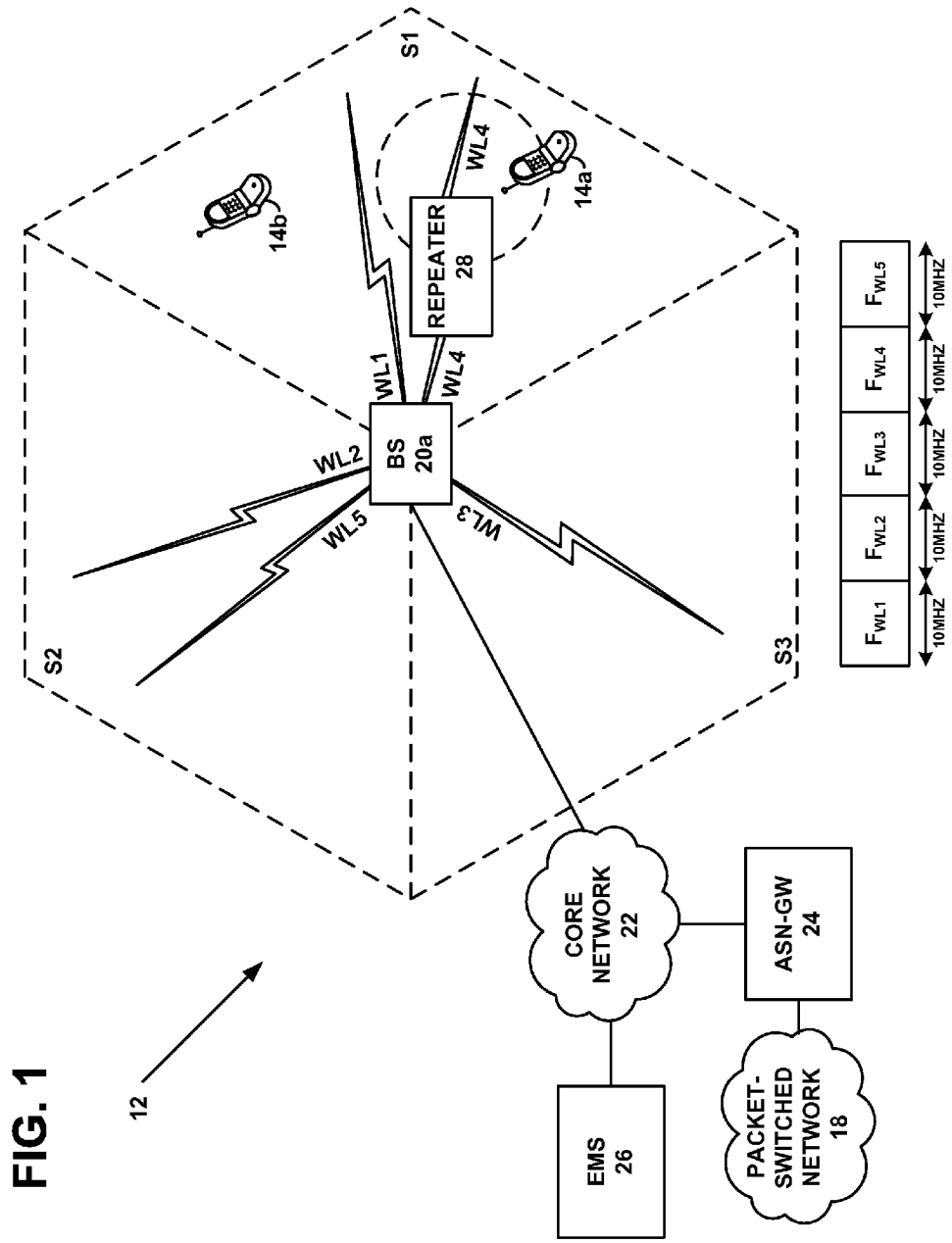
FIG. 1 is a simplified block diagram of a communication system in which an exemplary method can be implemented.

Referring to the drawings, FIG. 1 is a simplified block diagram of a communications system in which an exemplary method can be implemented. As shown, the system includes an access network 12, which may function to provide connectivity between one or more mobile stations (e.g., cell phones, PDAs, netbooks, tablets, and/or other wirelessly-equipped devices), such as a first mobile station 14a and a second mobile station 14b, and one or more packet-switched networks (e.g., the global Internet), such as a packet-switched network 18.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As shown, access network 12 may include one or more base stations, such as a base station 20. (Although FIG. 1 depicts access network 12 as including a single base station, it should be understood that access network 12 may include more than one base station). Base station 20 may be any entity that facilitates communication between one or more mobile stations and access network 12. In this respect, base station 20 may radiate to define one or more wireless coverage areas (e.g., cells or cell sectors). Within each coverage area, base station 20 may provide one or more wireless links, each on a corresponding carrier, over which mobile stations located in the coverage area may communicate with base station 20. (As used herein, the term carrier may encompass a single carrier frequency or a group of carrier frequencies).

The wireless links of base station 20 will preferably carry communications between access network 12 and mobile station according to a Worldwide Interoperability for Microwave Access (WiMAX) protocol (e.g., IEEE 802.16). Alternatively, the wireless links may carry communications according to any other protocol now known or later developed, including CDMA (e.g., 1xRTT or 1xEV-DO (IS-856)), iDEN, TDMA, AMPS, GSM, GPRS, UMTS, EDGE, LTE, microwave, satellite, MMDS, Wi-Fi (e.g., IEEE 802.11), Bluetooth, and infrared. Depending on the protocol employed, the wireless links will also preferably be divided into a plurality of channels for carrying communications between mobile station and access network 12, such as downlink channels for carrying communications from access network 12 to mobile stations and uplink channels for carrying communications from mobile stations to access network 12.

Due to hardware and protocol constraints, each wireless link can only provide a finite number of channels, and thus can only support a finite number of simultaneous communications between access network 12 and mobile stations. In this respect, to increase a number of simultaneous communications that can occur between access network 12 and mobile stations in a particular coverage area, a base station may be configured to provide multiple wireless links in that coverage area. Such a configuration may be desirable in heavily-populated coverage areas (e.g., large cities).

For purposes of illustration, FIG. 1 depicts base station 20 being configured to provide two wireless links WL1 and WL4 in a first sector S1, two wireless links WL2 and WL5 in a second sector S2, and one wireless link WL3 in a third sector S3, with each wireless link having a 10 MHz frequency band. It should be understood, however, that the depicted configuration of sectors and wireless links is for purposes of illustration only, and that many other examples are possible as well.

Base station 20 of access network 12 may then couple to a core network 22, which provides connectivity with various other network entities. For example, core network 22 may provide connectivity with an access service node gateway (ASN-GW) 24 that functions to communicate with base station 20 and control aspects of base station 20 as well as aspects of the wireless communication with the mobile station. (Although FIG. 1 depicts access network 12 as including one ASN-GW connected to one base station, it should be understood that access network 12 may include more than one ASN-GW and that each ASN-GW may couple to multiple base stations). ASN-GW 24 may also provide connectivity with packet-switched network 18. As another example, core network 22 may provide connectivity with an element management system (EMS) 26 that functions to maintain data about the access network 12, such as data defining the configuration of the access network 12.

As shown, access network 12 may additionally include one or more repeaters that each function to repeat signals on a corresponding wireless link, such as a narrowband repeater 28 that repeats signals on wireless link WL4 (and the corresponding 10 MHz carrier) in sector S1. Narrowband repeater 28 may radiate to define a coverage area in which narrowband repeater 28 provides a repeated version of wireless link WL4. Preferably, the repeater's coverage area will fill a hole in sector S1 in which wireless links WL1 and WL4 have insufficient channel quality (e.g., carrier-to-interference noise ratio (CINR) and/or received signal strength indication (RSSI)) to support a communication with a mobile station 14. As such, in the narrowband repeater's coverage area, only the repeated version of wireless link WL4 may have sufficient channel quality to support a communication with a mobile station.

In operation, narrowband repeater 28 may receive signals from base station 20 over wireless link WL4, amplify the signals, and then transmit the amplified signals into the repeater's coverage area over the repeated version of wireless link WL4 for receipt by a mobile station. Correspondingly, narrowband repeater 28 may receive signals from a mobile station located inside the repeater's coverage area over the repeated version of wireless link WL4, amplify the signals, and then transmit the amplified signals to base station 20 over wireless link WL4. The narrowband repeater 28 may perform other functions as well.

Most repeaters available today perform only limited processing on the signals they repeat, and do not otherwise engage in communication with other entities. As such, when access network 12 is engaging in a communication with a mobile station, access network 12 may not be able to readily determine whether that mobile station is located inside a coverage area of a repeater, and in turn, whether the communication is passing through the repeater. For example, if access network 12 is engaging in a communication with mobile station 14a over wireless link WL4, access network 12 may not be able to readily determine whether mobile station 14a is located in the coverage area of narrowband repeater 28, and in turn, whether the communication is passing through narrowband repeater 28.

Accordingly, disclosed herein is an exemplary method of determining whether a mobile station is located inside a coverage area of a repeater. The exemplary method is based on the principle that, absent a repeater, wireless links provided by the same base station in the same wireless coverage area (e.g., wireless links WL1 and WL4 in sector S1) typically have similar channel quality (e.g., CINR and/or RSSI). As such, if a mobile station located in a wireless coverage area with multiple wireless links detects different levels of channel quality on those wireless links, the mobile station is likely located inside a coverage area of a repeater for one of those wireless links.

Figure 2:
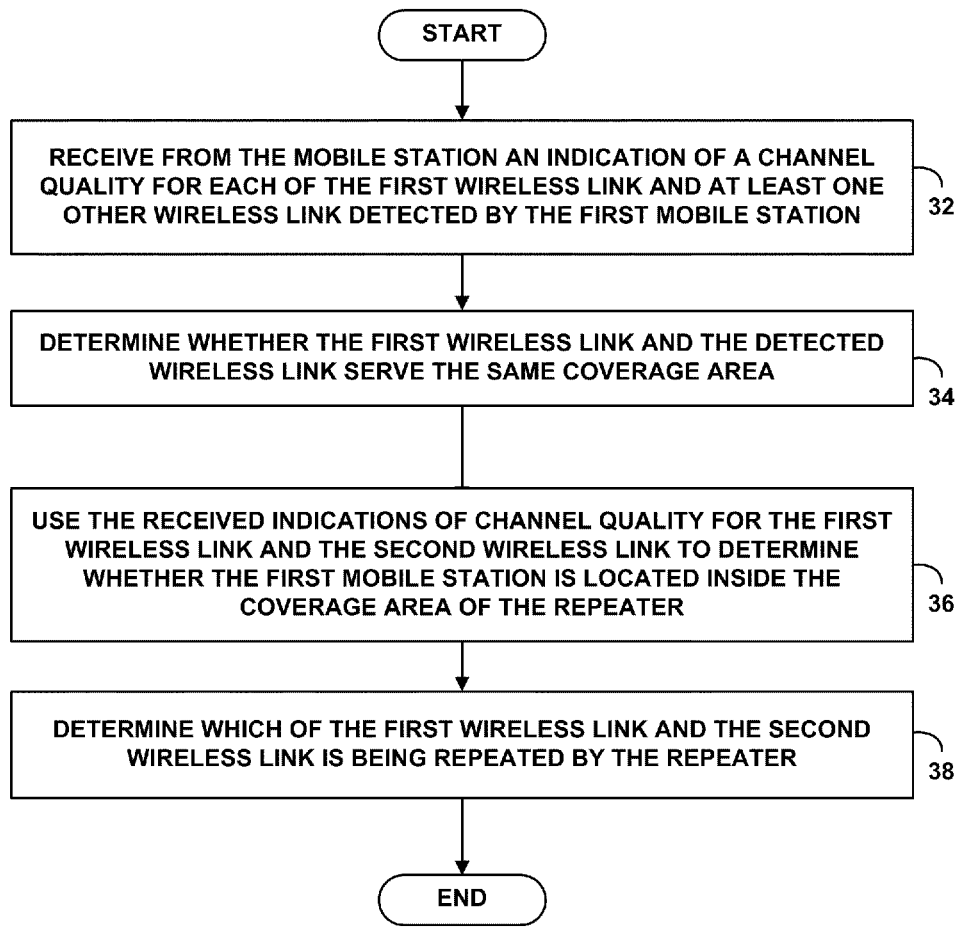
FIG. 2 is a flow chart depicting an exemplary method of determining whether a mobile station is located inside a coverage area of a repeater.

FIG. 2 is a flow chart depicting an exemplary method of determining whether a mobile station (e.g., mobile station 14a) is located inside a coverage area of a repeater. For purposes of illustration, the following description will assume that access network 12 is initially communicating with mobile station 14a over wireless link WL1 in sector S1, narrowband repeater 28 repeats signals on wireless link WL4 in sector S1, and base station 20 carries out the exemplary method.

The exemplary method may begin at step 32 when base station 20 receives from mobile station 14a an indication of a channel quality (e.g., CINR and/or RSSI) for each of wireless link WL1 and at least one other wireless link detected by mobile station 14a (e.g., wireless link WL4). Preferably, along with the indication of channel quality for each of wireless link WL1 and the detected wireless link, base station 20 will also receive an identifier of each of wireless link WL1 and the detected wireless link. Base station 20 may receive the indications of channel quality and the identifiers from mobile station 14a in various manners. In one example, base station 20 may receive the indications of channel quality and the identifiers in a MOV_SCN-REP message, which mobile station 14a may send to report the result of a wireless-link scan. As another example, the base station 20 may receive the indications of channel quality and the identifiers in a MOB_MSHO-REQ message, which mobile station 14a may send to request a handover. Other examples are possible as well.

At step 34, after receiving the indication of channel quality for each of wireless link WL1 and the detected wireless link, base station 20 may determine whether wireless link WL1 and the detected wireless link serve the same coverage area. Base station 20 may make this determination using various techniques. In one aspect, base station 20 may determine whether wireless link WL1 and the detected wireless link serve the same coverage area based on data defining the base station's wireless links, which may be maintained at base station 20 and/or another entity accessible to base station 20 (e.g., EMS 26). Preferably, the data defining the base station's wireless links will include an identifier of each wireless link and an identifier of each wireless link's coverage area. Additionally, the data defining the base station's wireless links may include an association between identifiers of wireless links that serve the same coverage area. Using this data, in one example, base station 20 may identify the first wireless link's coverage area and the detected wireless link's coverage area and then compare the identified coverage areas to determine whether they are the same coverage area. In another example, base station 20 may determine whether the identifiers of wireless link WL1 and the detected wireless link are associated. Other examples are possible as well.

If base station 20 determines that wireless link WL1 and the detected wireless link serve the same coverage area (e.g., the detected wireless link is wireless link WL4), base station 20 may then proceed to step 36. At step 36, base station 20 may then use the received indications of channel quality (e.g., CINR and/or RSSI) for wireless link WL1 and wireless link WL4 to determine whether mobile station 14a is located inside a coverage area of a repeater. Preferably, base station 20 will determine whether mobile station 14a is located inside a coverage area of a repeater by comparing the received indications of channel quality for wireless link WL1 and wireless link WL4. Base station 20 may perform this comparison in various manners.

In one aspect, base station 20 may calculate a difference between the received indications of channel quality for wireless link WL1 and wireless link WL4 and then compare the difference to a first threshold. In this respect, the first threshold may take various forms depending on a modulation scheme employed in the narrowband repeater's coverage area, among other factors. For example, the first threshold may be 6 dB for QPSK, 12 dB for 16QAM, or 20 dB for 64QAM. Many other examples are possible as well. If the calculated difference is greater than a first threshold (e.g. indicating that the wireless links have different channel conditions), base station 20 may determine that mobile station 14a is located inside the coverage area of a repeater. Alternatively, if the calculated difference is less than or equal to the first threshold (e.g. indicating that the wireless links have similar channel conditions), base station 20 may determine that mobile station 14a is located outside the coverage area of a repeater.

In another aspect, before calculating a difference between the received indications of channel quality for wireless link WL1 and wireless link WL4 and comparing the difference to a first threshold, base station 20 may first compare the received indications of channel quality for wireless link WL1 and wireless link WL4 to a second threshold, to determine that one of the received indications of channel quality exceeds the second threshold.

At step 38, if base station 20 determines that mobile station 14a is located inside the coverage area of a repeater, base station 20 may also determine which of wireless link WL1 and wireless link WL4 is being repeated by the repeater. Base station 20 may make this determination using various techniques.

In one aspect, base station 20 may determine which of wireless link WL1 and wireless link WL4 is being repeated by narrowband repeater 28 based on the received indications of channel quality for wireless link WL1 and wireless link WL4. In this respect, base station 20 may determine that the wireless link with the greater indication of channel quality is the wireless link being repeated by a repeater (e.g., wireless link WL4 in FIG. 1).

In another aspect, base station 20 may determine which of wireless link WL1 and wireless link WL4 is being repeated by narrowband repeater 28 based on the data defining the base station's wireless links, which may additionally include data indicating which wireless links are repeated by a repeater. In this respect, the base station 20 may look up wireless link WL1 and wireless link WL4 in the data defining the base station's wireless links (e.g., which is stored at base station 20 and/or EMS 26), to determine which wireless link is being repeated by narrowband repeater 28 (e.g., wireless link WL4 in FIG. 1). Base station 20 may also use the predefined data to confirm that one of wireless link WL1 and wireless link WL4 is being repeated by narrowband repeater 28.

Accordingly, the exemplary method may provide access network 12 with an improved technique for determining whether a mobile station is located inside the coverage area of a repeater. Advantageously, the disclosed method of determining whether a mobile station is located inside a coverage area of a repeater may also be incorporated into an improved handover procedure that avoids interruption of communication (e.g., a dropped call due to application of a load threshold) with a mobile station moving into a coverage area of repeater and requesting a handover to the repeated wireless link.

In a typical handover procedure, base station 20 may receive from a mobile station (e.g., mobile station 14a) a request for a handover from wireless link WL1 to a new wireless link. This handover request may identify one or more other wireless links detected by mobile station 14a. In response to receiving the handover request, base station 20 may whether each detected wireless link has sufficient channel parameters (e.g., capacity, quality of service (QoS), etc.) for the communication. If a detected wireless link has channel parameters with sufficient values, base station 20 may determine that the detected wireless link is suitable for the handover, and may ultimately hand over the communication from the first wireless link to the detected wireless link. Alternatively, if a detected wireless link has one or more channel parameters with insufficient values, base station 20 may determine that the detected wireless link is not suitable for the handover, and may ultimately refuse to hand over the communication from the first wireless link to the detected wireless link (and may instead hand over the communication to another wireless link).

Figure 3:
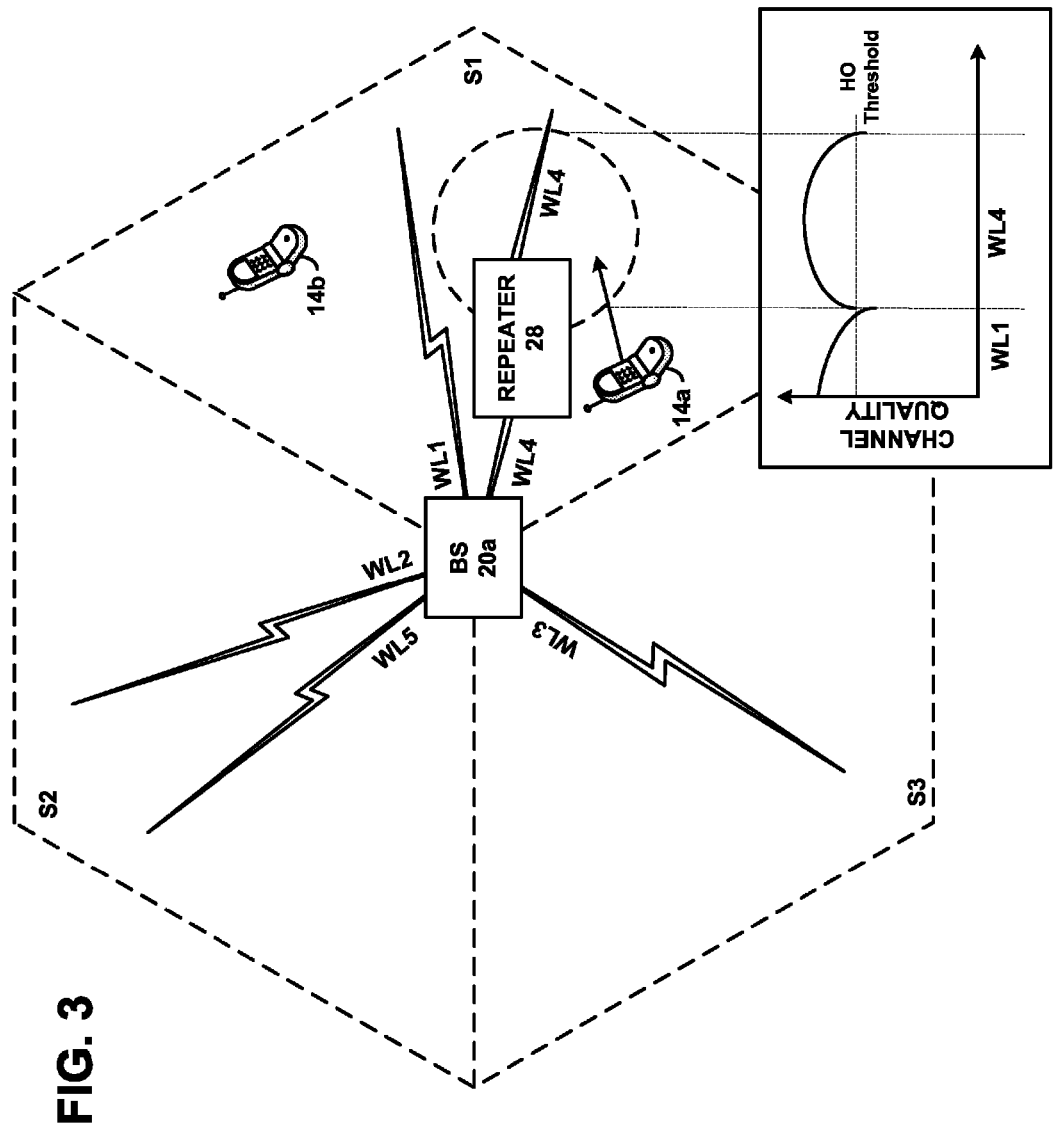
FIG. 3 is an illustration of channel quality as a mobile station moves into a coverage area of a repeater in the communication system depicted in FIG. 1.

While this handover procedure generally works well to facilitate seamless communication with the mobile station 14a as it moves through coverage areas of access network 12, it may result in an interruption of communication when the mobile station 14a is communicating over wireless link WL1 as it moves into the coverage area of narrowband repeater 28—and thus the hole in sector S1. FIG. 3 depicts such a scenario. As shown, as mobile station 14a moves into the coverage area of narrowband repeater 28, it will detect a degrade in the channel quality of wireless link WL1. In turn, mobile station 14a may responsively request a handover of the communication from wireless link WL1 to a new wireless link. This handover request will likely identify only wireless link WL4 as a detected wireless link, because because mobile station 14a is located within first sector S1 and the repeated wireless link WL4 will be the only link with sufficient channel quality. If wireless link WL4 does not have sufficient channel parameters (e.g., capacity and/or QoS) for the communication, however, base station 20 employing a typical handover procedure may refuse to hand over the communication to wireless link WL4. As mobile station 14a continues to move into the coverage area of narrowband repeater 28—and the hole in sector S1—channel quality on the wireless link WL1 may then become insufficient to support the communication, thus resulting in interruption (e.g., call drop and session disconnection).

Accordingly, disclosed herein is an exemplary handover procedure that may avoid this interruption in a coverage area with multiple wireless links, one of which is being repeated by a repeater. In such a configuration, the repeated wireless link may be supporting a number of communications with a base station, some of which need to pass through the repeater and others of which can occur directly with the base station. According to the exemplary handover procedure, the base station may use the techniques described above to identify which mobile stations are moving into a coverage area of the repeater, and thus which communications likely need to pass through the repeater. In turn, the base station may responsively handover communications that need to pass through the repeater from an unrepeated wireless link to the repeated wireless link, to avoid interruption of those communications. Similarly, if there is a high load on the repeated wireless link, the base station may use the techniques described above to identify which mobile stations are located outside a coverage area of the repeater, and thus which communications likely are occurring directly with the base station. In turn, the base station may handover communications occurring directly with the base station from the repeated wireless link to the unrepeated wireless link, to reduce the load on the repeated link.

Figure 4:
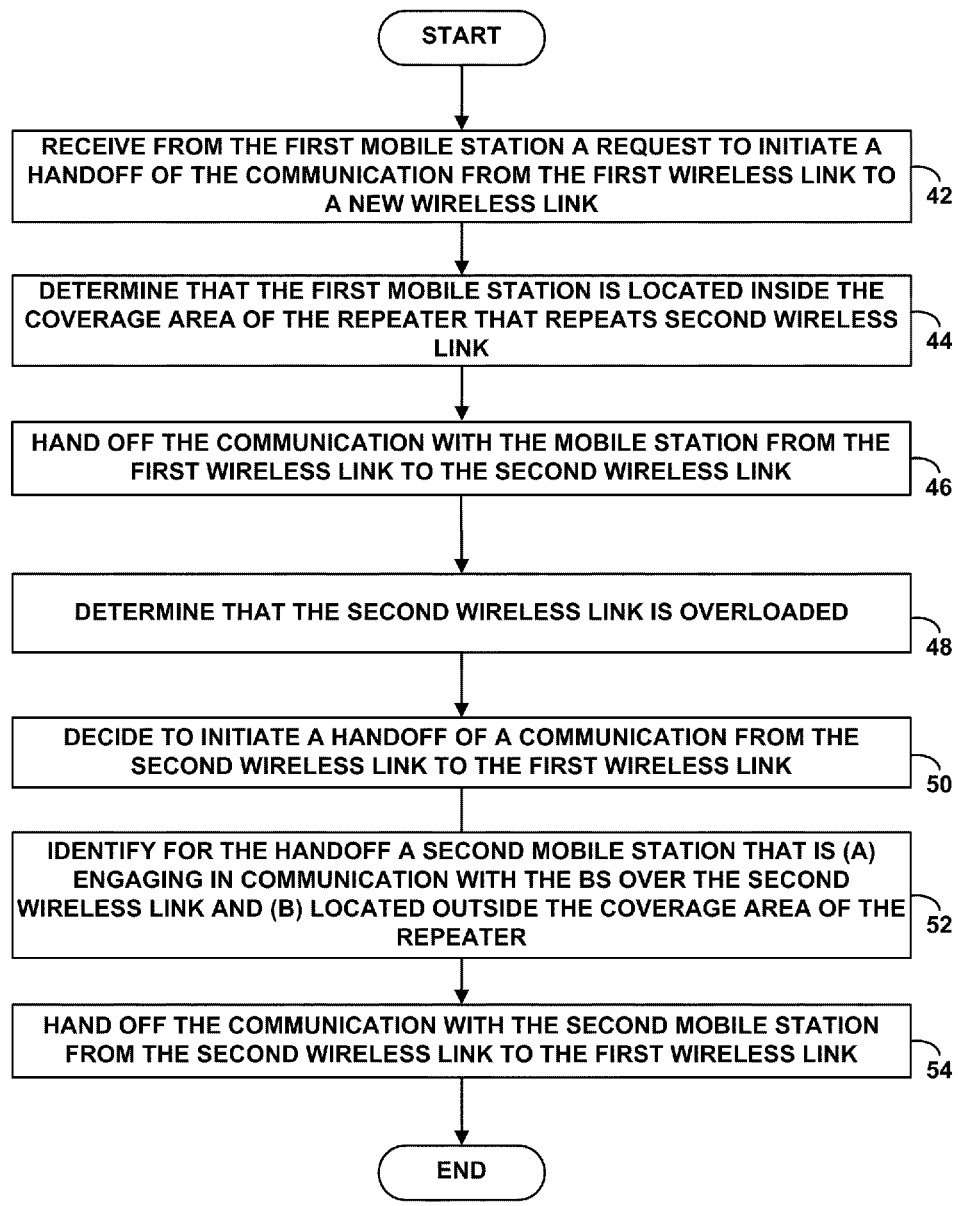
FIG. 4 is a flow chart depicting an exemplary method of handing over a communication with a mobile station moving into a coverage area of a repeater.

FIG. 4 is a flow chart depicting an exemplary method of handing over a communication with a mobile station (e.g., mobile station 14a) moving into a coverage area of a repeater. For purposes of illustration, the following description will assume that access network 12 is initially communicating with mobile station 14*a* over wireless link WL1 in sector S1, mobile station 14*a* is moving into the coverage area of narrowband repeater 28 that repeats wireless link WL4 in sector S1, and base station 20 carries out the exemplary method.

The exemplary method may begin at step 42 when base station 20 receives from mobile station 14*a* a request to initiate a handover of the communication from wireless link WL1 to a new wireless link. The mobile station 12 may send this request in response to various triggers, such as detecting a decrease in the first wireless link's channel quality and/or scanning a neighbor wireless link with appreciably better channel conditions for instance. The mobile station's request will preferably include an identifier and an indication of channel quality (e.g., CINR and/or RSSI) for each of wireless link WL1 and at least one other wireless link detected by mobile station 14*a*. In this respect, because mobile station 14*a* is moving into the coverage area of narrowband repeater 28 that repeats wireless link WL4, the mobile station's request will preferably include an identifier and an indication of channel quality for wireless link WL4 as a detected wireless link.

At step 44, base station 20 may determine that mobile station 14*a* is moving into the coverage area of narrowband repeater 28 that repeats wireless link WL4, preferably using techniques described above with reference to FIG. 2. For example, base station 20 may (a) determine that wireless link WL1 and wireless link WL4 serve the same coverage area, (b) use indications of channel quality for wireless link WL1 and wireless link WL4 that base station 20 received from mobile station 14*a* (e.g., in the handover request and/or a scan report) to determine that mobile station 14*a* is moving into the coverage area of a repeater, and then (c) determine that wireless link WL4 is being repeated by the repeater.

At step 46, in response to determining that mobile station 14*a* is moving into the coverage area of a repeater that repeats wireless link WL4 (and thus that the communication likely needs to pass through the repeater), base station 20 may initiate a handover of the communication with mobile station from the wireless link WL1 to wireless link WL4. In doing so, base station 20 may suspend application of a load threshold that it would have otherwise applied to wireless link WL4 during the handover. As a result, wireless link WL4 may temporarily become highly loaded (e.g., the loading on wireless link WL4 may temporarily exceed a load threshold).

At step 48, after initiating the handover the communication with mobile station 14*a* from wireless link WL1 to wireless link WL4 (e.g., either during or after the handover), base station 20 may determine that wireless link WL4 is (or will be) highly loaded. In this respect, base station 20 may determine that wireless link WL4 is highly loaded as a result of reinstating application of a load threshold for wireless link WL4 that it suspended when initiating the handover of the communication with mobile station from the wireless link WL1 to wireless link WL4.

At step 50, in response to determining that wireless link WL4 is (or will be) highly loaded, base station 20 may decide to initiate a handover of a communication from wireless link WL4 to another wireless link (e.g., wireless link WL1). In turn, at step 52, base station 20 may identify for the handover a mobile station that is (a) engaging in communication with base station 20 over wireless link WL4 and (b) located outside the coverage area of narrowband repeater 28 (and thus a communication that is likely occurring directly with base station 20). In this respect, base station 20 will preferably determine whether mobile station 14*b* is located outside the coverage area of narrowband repeater 28 using techniques described above with reference to FIG. 2. For example, base station 20 may use indications of channel quality for the wireless links WL1 and WL4 that base station 20 received from mobile station 14*b* (e.g., in a handover request and/or a scan report) to determine that mobile station 14*b* is located outside the coverage area of narrowband repeater 28. Base station 20 may identify mobile station 14*b* using other techniques as well. At step 54, base station 20 may then hand over the communication with mobile station 14*b* from wireless link WL4 to another wireless link (e.g., wireless link WL1).

Figure 5:
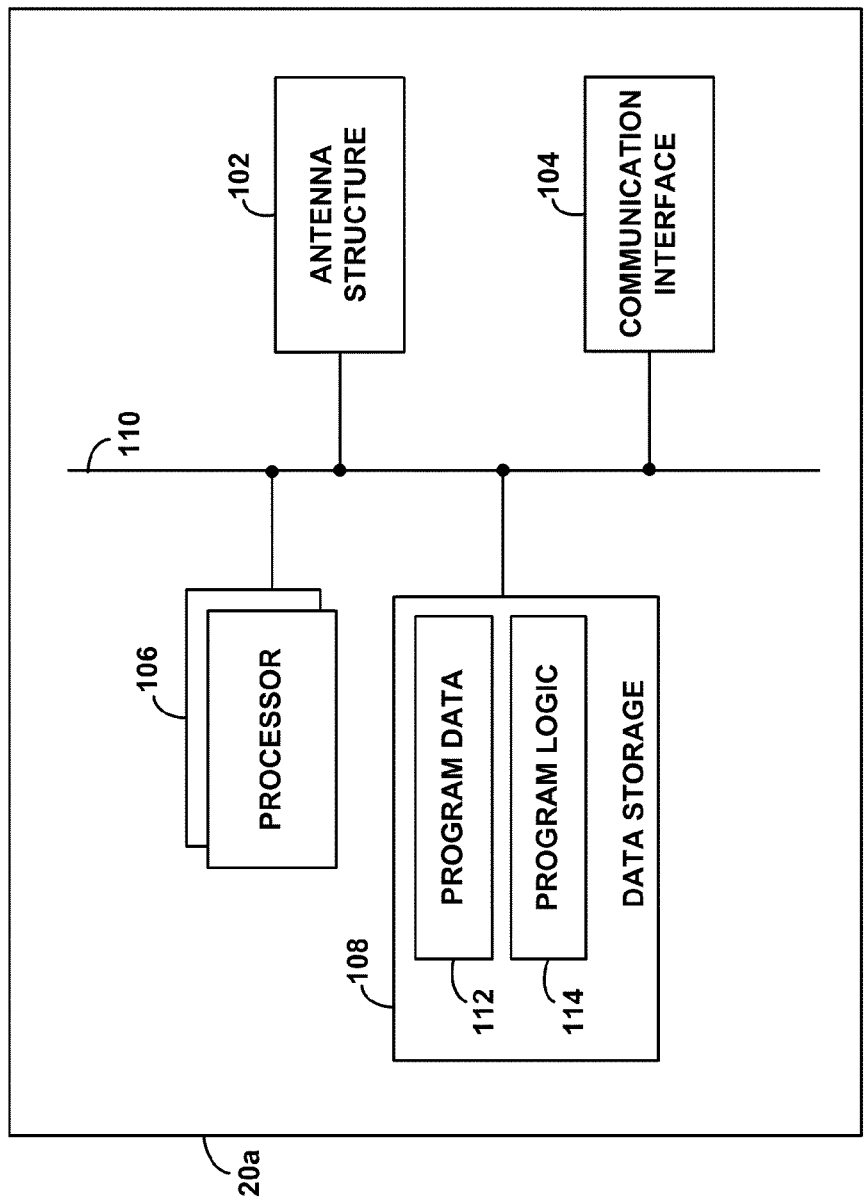
FIG. 5 is a simplified block diagram showing functional components of an exemplary base station capable of carrying out the exemplary methods of FIGS. 2-3.

FIG. 5 is a simplified block diagram showing functional components of an exemplary base station 20 capable of carrying out the exemplary methods of FIGS. 2-3. As shown in FIG. 5, exemplary base station 20 may include an antenna structure 102, a communication interface 104, a processor 106, and data storage 108, all linked together via a system bus, network, or other connection mechanism 110.

Referring to FIG. 5, the antenna structure 102 may be the component of exemplary base station 20 that radiates to define one or more wireless coverage areas and provide one or more wireless links within each wireless coverage area. For purposes of illustration, the following description will assume that the antenna structure 102 is configured to provide wireless links WL1 and WL4 in sector S1, wireless links WL3 and WL4 in sector S2, wireless link WL5 in sector S5. The antenna structure 102 may include one or more antennas arranged in various ways. For example, the one or more antennas may include one or more directional (e.g., sectored) antennas. In another example, the one or more antennas may include one or more antennas for receiving RF signals and one or more antennas for transmitting RF signals. Other configurations are also possible.

The communication interface 104 preferably functions to communicatively couple exemplary base station 20 to other network entities, such as ASN-GW 24 (and perhaps other entities). As such, the communication interface 104 may take the form of an Ethernet network interface card, a chipset and antenna adapted to facilitate wireless communication according a desired protocol, and/or any other form that provides for wired and/or wireless communication with ASN-GW 24. The communication interface 104 may also include multiple communication interfaces, such as one through which exemplary base station 20 sends data to ASN-GW 24 and one through which exemplary base station 20 receives data from ASN-GW 24. Other configurations are also possible.

The processor 106 may comprise one or more general purpose microprocessors and/or dedicated signal processors. (The term "processor" encompasses either a single processor or multiple processors that could work in combination.) Data storage 108, in turn, may comprise memory and/or other storage components, such as optical, magnetic, organic or other memory, which can be volatile and/or non-volatile, internal and/or external, and integrated in whole or in part with the processor 106. Data storage 108 preferably contains or is arranged to contain (i) program data 112 and (ii) program logic 114. Although these components are described herein as separate data storage elements, the elements could just as well be physically integrated together or distributed in various other ways. In a preferred example, the program data 112 would be maintained in data storage 108 separate from the program logic 114, for easy updating and reference by the program logic 114.

Program data 112 may contain information relating to the wireless links of exemplary base station 20. For example, program data 112 may contain an identifier each wireless link provided by exemplary base station 20. As another example, program data 112 may contain an identifier of a coverage area served by each wireless link provided by exemplary base station 20. As yet another example, program data 112 may contain an indication of whether each wireless link is repeated by a repeater. Other examples are possible as well.

Program data 112 may also contain information relating to the mobile stations 14 engaging in communication with exemplary base station 20. For example, program data 112 may contain an identifier of each mobile station engaging in communication with exemplary base station 20. As another example, for each mobile station engaging in communication with exemplary base station 20, program data 112 may contain an identifier for each of the wireless link over which mobile station is currently communicating and one or more other wireless links detected by mobile station 14. As yet another example, for each mobile station engaging in communication with exemplary base station 20, program data 112 may contain an indication of channel quality (e.g., CINR and/or RSSI) for each of the wireless link over which mobile station is currently communicating and one or more other wireless links detected by mobile station 14. Program data 112 may contain other types of data as well.

Program logic 114 preferably comprises machine-language instructions that may be executed or interpreted by processor 106 to carry out functions in accordance with the exemplary methods described in FIGS. 2-3. It should be understood, however, that the program logic 114 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

In one aspect, the program logic 114 may be executable by the processor 106 to determine whether a mobile station is located inside a coverage area of a repeater. For example, the program logic 114 may be executable by the processor 106 to (a) communicate with a mobile station over a first wireless link, (b) receive from the mobile station an indication of channel quality (e.g., CINR and/or RSSI) for each of the first wireless link and a second wireless link detected by mobile station 14, (c) determine that the first wireless link and the second wireless link serve a same coverage area of base station 20, and (d) after determining that the first wireless link and the second wireless link serve the same coverage area, using the received indications of channel quality for the first wireless link and the second wireless link to determine whether the mobile station is located inside a coverage area of a repeater.

In another aspect, the program logic 114 may be executable by the processor 106 to hand over a communication with a first mobile station moving into a coverage area of a repeater. For example, the program logic 114 may be executable by the processor 106 to (a) engage in a communication with the first mobile station over a first wireless link, (b) receive from first mobile station a request to initiate a handover of the communication from the first wireless link to a new wireless link, where the request includes an indication of channel quality for each of the first wireless link and a second wireless link detected by the first mobile station, (c) in response to receiving the request, determine that the first mobile station is moving into a coverage area of a repeater that repeats the second wireless link, and (d) in response to determining that the first mobile station is moving into a coverage area of a repeater that repeats the second wireless link, hand over the communication with the first mobile station from the first wireless link to the second wireless link.

Additionally, after handing over the communication with the first mobile station from the first wireless link to the second wireless link, the program logic 114 may be executable by the processor 106 to (e) determine that the second wireless link is highly loaded, (f) in response to determining that the second wireless link is highly loaded, decide to initiate a handover of a communication from the second wireless link to another wireless link, (g) identify for the handover a second mobile station that is (1) engaging in a communication with the access network over the second wireless link and (2) located outside the coverage area of the repeater, and (h) hand over the communication with the second mobile station from the second wireless link to another wireless link.

Exemplary embodiments have been described above. Those skilled in the art will understand, however, that changes and modifications may be made to the embodiments described without departing from the true scope and spirit of the present invention, which is defined by the claims.

We claim:

1. A method comprising:
an access network providing at least two wireless links that each serve a same given coverage area, wherein one of two wireless links serving the given coverage area is being repeated by a repeater;
an access network communicating with a mobile station over a first wireless link of the two wireless links serving the given coverage area;
while communicating with the mobile station over the first wireless link, the access network receiving from the mobile station an indication of channel quality for each of the first wireless link and a second wireless link of the two wireless links serving the given coverage area; and
the access network using the received indications of channel quality for the first wireless link and the second wireless link to determine that the mobile station is located inside a coverage area of the repeater that is repeating one of the two wireless links serving the given coverage area.

2. The method of claim 1, wherein each indication of channel quality comprises a carrier-to-interference noise ratio.

3. The method of claim 1, wherein each indication of channel quality comprises a received signal strength indication.

4. The method of claim 1, wherein the access network using the received indications of channel quality for the first wireless link and the second wireless link to determine that the mobile station is located inside the coverage area of the repeater that is repeating one of the two wireless links serving the given coverage area comprises:
the access network calculating a difference between the received indications of channel quality for the first wireless link and the second wireless link;
the access network comparing the calculated difference to a first threshold; and
based on the comparing, the access network determining that the calculated difference is greater than the first threshold and thereby determining that the mobile station is located inside the coverage area of the repeater that is repeating one of the two wireless links serving the given coverage area.

5. The method of claim 1, wherein the access network using the received indications of channel quality for the first wireless link and the second wireless link to determine that the mobile station is located inside the coverage area of the repeater that is repeating one of the two wireless links serving the given coverage area comprises:
the access network determining that one of the received channel indications is greater than a first threshold;

in response to determining that one of the received channel indications is greater than the first threshold, the access network calculating a difference between the received indications of channel quality for the first wireless link and the second wireless link;

the access network comparing the calculated difference to a second threshold; and based on the comparing, the access network determining that the calculated difference is greater than the second threshold and thereby determining that the mobile station is located inside the coverage area of the repeater that is repeating one of the two wireless links serving the given coverage area.

6. The method of claim 1, further comprising:
the access network identifying which wireless link of the two wireless links serving the given coverage area is being repeated by the repeater.

7. The method of claim 6, wherein the access network identifying which wireless link of the two wireless links serving the given coverage area is being repeated by the repeater comprises:
the access network determining which of the first wireless link and the second wireless link has a greater indication of channel quality.

8. The method of claim 6, wherein the access network identifying which wireless link of the two wireless links serving the given coverage area is being repeated by the repeater comprises:
the access network identifying which wireless link of the two wireless links serving the given coverage area is being repeated by the repeater based on data indicating which wireless links of the access network are being repeated by a repeater.

9. A base station comprising:
an antenna structure for communicating with one or more mobile stations over respective wireless links;
a communication interface for communicating with a network entity;
a processor;
data storage; and
program instructions stored in the data storage and executable by the processor for:
providing at least two wireless links that each serve a same given coverage area, wherein one of two wireless links serving the given coverage area is being repeated by a repeater
communicating with a mobile station over a first wireless link of the two wireless links serving the given coverage area;
while communicating with the mobile station over the first wireless link, receiving from the mobile station an indication of channel quality for each of the first wireless link and a second wireless link of the two wireless links serving the given coverage area; and
using the received indications of channel quality for the first wireless link and the second wireless link to determine that the mobile station is located inside a coverage area of the repeater that is repeating one of the two wireless links serving the given coverage area.

10. The method of claim 1, wherein the access network using the received indications of channel quality for the first wireless link and the second wireless link to determine that the mobile station is located inside the coverage area of the repeater that is repeating one of the two wireless links serving the given coverage area comprises the access network using the received indications of channel quality for the first wireless link and the second wireless link to determine that the mobile station is located inside the coverage area of the repeater that is repeating the second wireless link.

11. The method of claim 10, further comprising:
in response to determining that the mobile station is located inside the coverage area of the repeater that is repeating the second wireless link, the access network initiating a handover of a communication with the mobile station from the first wireless link to the second wireless link.

12. The method of claim 11, wherein the access network initiating a handover of the communication with the mobile station from the first wireless link to the second wireless link comprises:
the access network suspending application of a load threshold that would have otherwise been applied to the second wireless link.

13. The method of claim 12, wherein the access network suspending application of the load threshold that would have otherwise been applied to the second wireless link comprises:
the access network disregarding the load threshold for the second wireless link.

14. The method of claim 11, further comprising:
after initiating the handover the communication with the mobile station from the first wireless link to the second wireless link, the access network determining that the second wireless link is highly loaded;
in response to determining that the second wireless link is highly loaded, the access network deciding to initiate a handover of a communication from the second wireless link to the first wireless link;
the access network identifying for the handover a second mobile station that is (a) engaging in a communication with the access network over the second wireless link and (b) located outside the coverage area of the repeater that is repeating the second wireless link; and
the access network handing over the communication with the second mobile station from the second wireless link to the first wireless link.

15. The method of claim 14, wherein the access network identifying for the handover a second mobile station that is located outside the coverage area of the repeater that is repeating the second wireless link comprises:
the access network receiving from the second mobile station an indication of channel quality for each of the first wireless link and the second wireless link;
the access network using the indications of channel quality received from the second mobile station to determine that the second mobile station is located outside the coverage area of the repeater that is repeating the second wireless link.

16. The method of claim 15, wherein the access network using the indications of channel quality received from the second mobile station to determine that the second mobile station is located outside the coverage area of the repeater that is repeating the second wireless link comprises:
the access network calculating a difference between the indications of channel quality received from the second mobile station;
the access network comparing the calculated difference to a predefined threshold; and
the access network determining that the calculated difference is less than or equal to the predefined threshold.

* * * * *